United States Patent [19]
Gold

[11] Patent Number: 5,634,841
[45] Date of Patent: Jun. 3, 1997

[54] METHODS AND APPARATUS FOR REMOVING SCRATCHES AND/OR STAINS FROM VEHICLE WINDSHIELDS

[76] Inventor: Peter Gold, 465 N. Wood Rd., Rockville Centre, N.Y. 11570

[21] Appl. No.: 555,039

[22] Filed: Nov. 8, 1995

[51] Int. Cl.$^6$ ................................................ B24B 1/00
[52] U.S. Cl. ........................ 451/59; 451/434; 451/527; 451/525; 15/250.41; 15/250.48
[58] Field of Search ..................... 451/41, 59, 495, 451/523, 524, 525, 527, 528, 504, 507, 434; 15/250.4, 250.41, 250.48

[56] References Cited

U.S. PATENT DOCUMENTS

| | | | |
|---|---|---|---|
| 3,606,709 | 9/1971 | Countryman | 451/507 |
| 3,906,583 | 9/1975 | Murphy | 15/250.41 |
| 4,208,758 | 6/1980 | Timmis et al. | 15/250.48 |
| 5,177,909 | 1/1993 | Klocke | 451/523 |
| 5,235,720 | 8/1993 | Kinder | 15/250.41 |
| 5,406,672 | 4/1995 | Hipke | 15/250.48 |

FOREIGN PATENT DOCUMENTS 234781  5/1911  Germany ........................ 451/525

*Primary Examiner*—James G. Smith
*Assistant Examiner*—Dona C. Edwards
*Attorney, Agent, or Firm*—Galgano & Burke

[57] ABSTRACT

An apparatus for removing scratches and/or stains from a vehicle windshield includes a cylindrical sponge having a radial opening which is dimensioned to fit snugly over a windshield wiper blade with the windshield wiper arm connected to the blade through the radial opening in the cylindrical sponge. The methods of the invention include moistening the cylindrical sponge and applying a polishing abrasive to either the sponge, the windshield, or both, and activating the vehicle windshield wiper to wipe the abrasive on the windshield with the sponge. Other methods of the invention include impregnating the sponge with a polishing abrasive, and/or moistening the sponge with windshield washer fluid.

17 Claims, 2 Drawing Sheets

15,634,841

METHODS AND APPARATUS FOR REMOVING SCRATCHES AND/OR STAINS FROM VEHICLE WINDSHIELDS

BACKGROUND OF THE INVENTION

1. Field of the Invention

The invention relates to polishing abrasives and polishing tools. More particularly, the invention relates to methods and apparatus for the abrasive polishing of vehicle windshields to remove scratches and/or stains.

2. State of the Art

Automobile, truck, and other vehicle windshields are subject to scratching by abrasive dirt, sand, and small stones. This is particularly so in certain environments rich in sand and other abrasive materials. Scratches on vehicle windshields are not merely an aesthetic problem, but can become a safety problem when the interfere with the driver's vision. The problem of scratched windshields is most prevalent in commercial and military vehicles which are frequently subjected to harsh environments.

The presently known method for removing scratches from vehicle windshields is to use a rotating polishing wheel such as the electric polishing wheel 10 shown in prior art FIG. 1. The polishing wheel 10 includes an electric motor 12 and a polishing pad 14 which is rotated by the motor 12. The motor 12 is typically driven by an AC voltage and is provided with a standard power cord 16. The polishing wheel 10 is usually used in conjunction with a polishing abrasive 18 such as a rare earth cerium oxide mixed with water. The abrasive may be applied to the windshield 20, to the pad 14, or to both. The polishing wheel 10 is powered on and the pad 14 is moved over the windshield 20 with the abrasive 18 being moved between the pad 14 and the windshield 20. Pressure is applied to the pad in order to effect an abrasive polishing. While this method is somewhat effective, it has several disadvantages. First, the polishing pad 14 is typically much smaller than the windshield 20 and therefore the windshield 20 must be polished in small segments. This results in an uneven polishing which can distort the glass (or other windshield material) and result in a distorted view through the windshield. Second, the rotating polishing pad tends to spew the polishing abrasive all over the vehicle, the operator of the polishing wheel, and the immediate surroundings. This requires a substantial clean-up effort after the polishing is completed. Third, the polishing wheel usually requires an AC power supply. This limits the availability of an emergency windshield polishing in the field.

Yet another problem is trying to remove spots that result immediately after the sweep of the windshield wiper over a wetted glass surface that truely cause restricted vision to the vehicle driver particularly when driving the vehicle in the rain. Even with the use of the windshield washer fluid, this condition of spots is not corrected simply because these spots are, in fact, stains on the outside glass surface. These stains are the chemical residue of, for example, road salt, oil, transmission fluid, carbon, acid rain, etc.

So far as is known, there is no presently available easy and facile method and apparatus that can be used by both the automotive technician and/or the laymen to deal with this long standing problem of scratch and/or stain impairment of windshield visibility which interferes with safe operation of a motor vehicle.

SUMMARY OF THE INVENTION

It is therefore an object of the invention to provide a novel method and apparatus for removing scratches and/or stains from a vehicle windshield.

It is also an object of the invention to provide a method and apparatus for removing scratches from a vehicle windshield which evenly polishes the windshield.

It is another object of the invention to provide a method and apparatus for removing scratches from a vehicle windshield which does not optically distort the windshield.

It is still another object of the invention to provide a method and apparatus for removing scratches from a vehicle windshield which is neat and efficient.

It is another object of the invention to provide a method and apparatus for removing scratches and/or stains from a vehicle windshield which can be used in the field.

It is a more particular object of this invention to provide a method and apparatus for removing stains from a vehicle windshield to eliminate resulting spotting immediately occuring after the sweep of a wiper blade on a wet windshield exterior glass surface.

It is still another object of the invention to provide a method and apparatus for removing scratches from a vehicle windshield which does not require AC power.

In accord with these objects which will be discussed in detail below, the apparatus of the present invention includes a cylindrical sponge having a radial opening which is dimensioned to fit snugly over a windshield wiper blade with the windshield wiper arm connected to the blade through the radial opening in the cylindrical sponge. The methods of the invention include moistening the cylindrical sponge and applying a polishing abrasive to either the sponge, the windshield, or both, and activating the vehicle windshield wiper to wipe the abrasive on the windshield with the sponge. Other methods of the invention include impregnating the sponge with a polishing abrasive, and/or moistening the sponge with windshield washer fluid. Preferred polishing abrasives for use with the methods of the invention includes rare earth cerium oxide sold under the Stock No. 263-1014 by SOMACA (5501 West Ogden Avenue, Chicago, Ill. and COMET® or AJAX® cleansers sold by Proctor and Gamble Cincinnati, Ohio 5202).

DETAILED DESCRIPTION OF THE PREFERRED EMBODIMENTS

Figure 1:
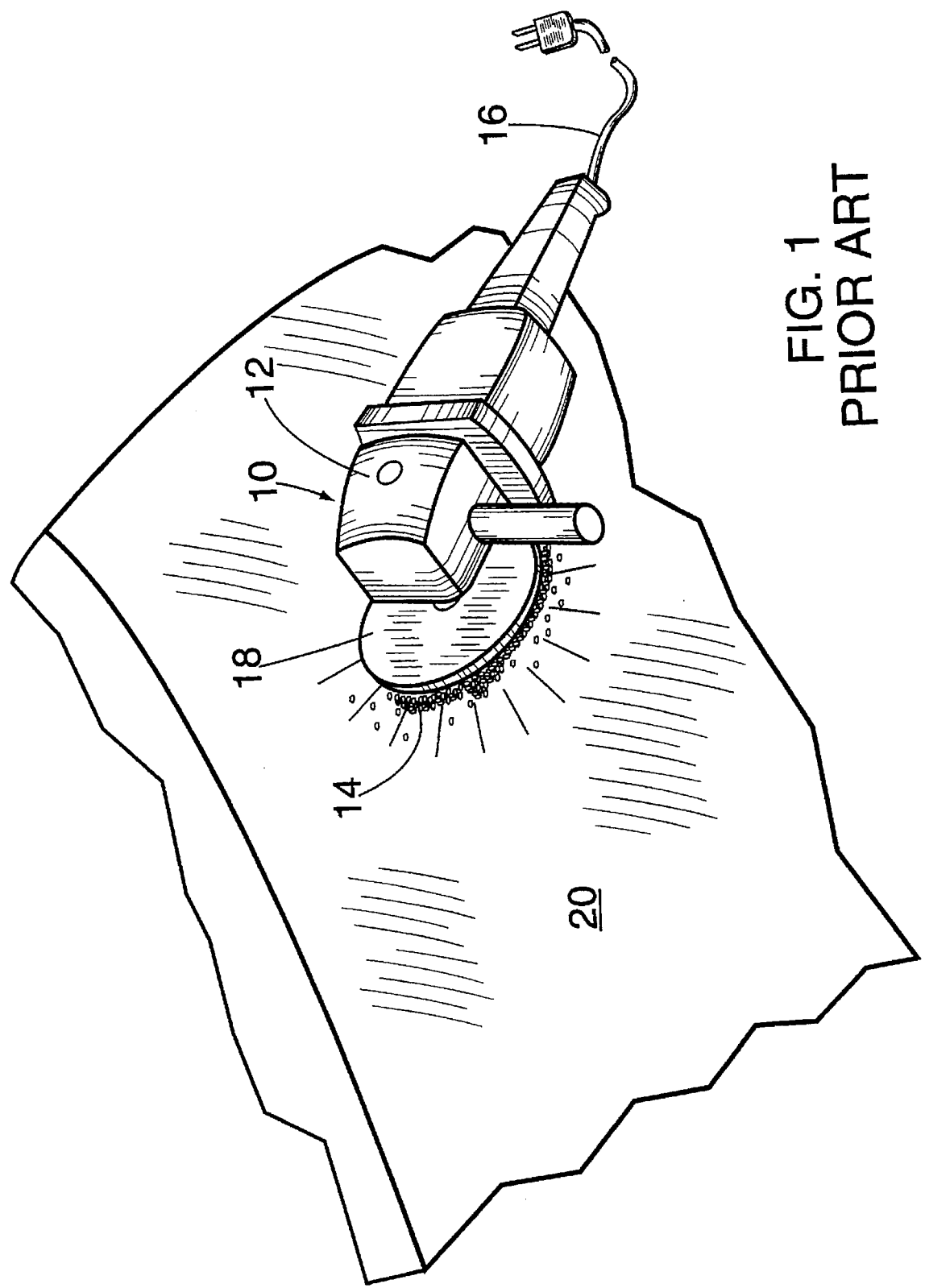
FIG. 1 is a broken perspective view of a prior art polishing wheel, polishing abrasive and vehicle windshield.
Figure 2:
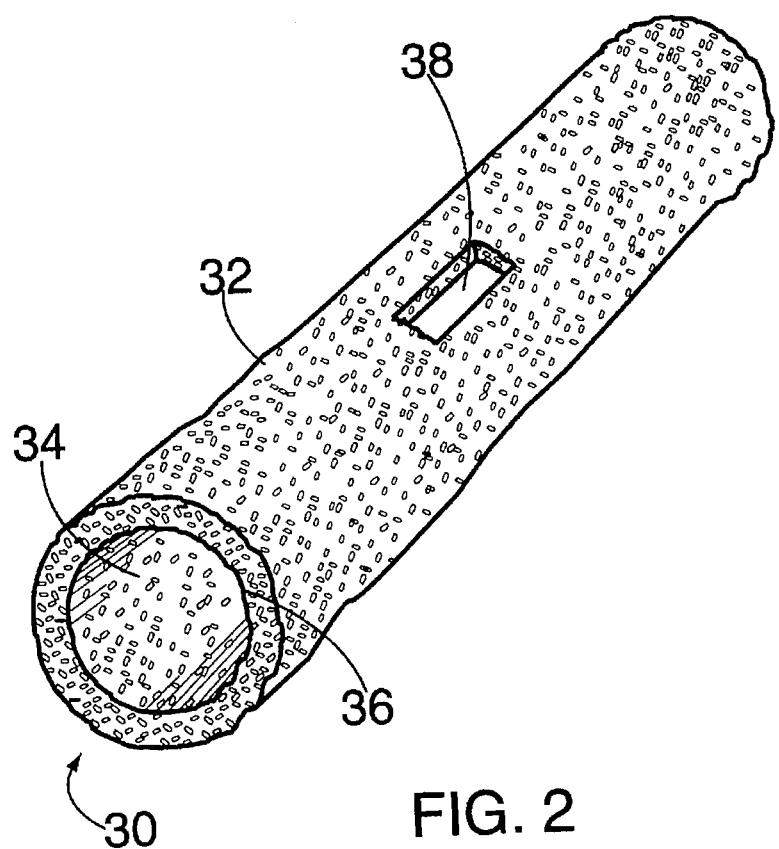
FIG. 2 is a perspective view of a polishing apparatus according to the invention.
Figure 3:
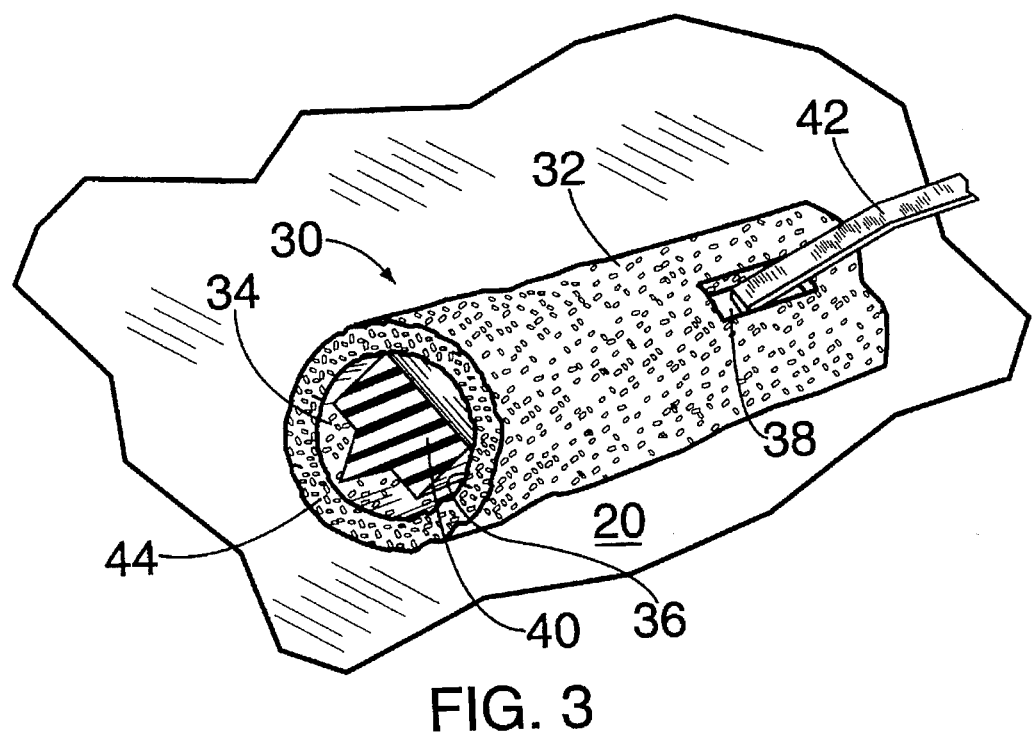
FIG. 3 is a broken perspective view of the polishing apparatus of FIG. 2 attached to a windshield wiper and impregnated with polishing abrasive.

Referring now to FIGS. 2 and 3, a windshield polishing apparatus 30 according to the invention includes a cylindrical sponge 32 made of conventional absorbent material having at least one open end 34 defining a longitudinal bore 36 and at least one radial opening 38 in communication with the bore 36. The sponge 32 is dimensioned so that a conventional windshield wiper blade 40 will fit snugly inside the bore 36. The radial opening 38 is dimensioned and located to allow a conventional windshield wiper arm 42 to enter the sponge 32 and connect to the wiper blade 40. When so mounted, the wiper arm 42 prevents the sponge 32 from shifting or sliding or otherwise becoming disengaged from the wiper blade.

From the foregoing, those skilled in the art will appreciate that the cylindrical sponge 32 may be attached to a wiper blade 40 by first removing the wiper blade 40 from the wiper arm 42, sliding the wiper blade 40 into the bore 36 of the sponge 32, aligning the radial opening 38 of the sponge 32 relative to the wiper blade 40 so that the arm 42 may be reattached to the wiper blade 40.

Once the sponge 32 is attached to the wiper blade 40 and the wiper blade 40 is re-attached to the wiper arm 42, as shown in FIG. 3, the windshield 20 may be polished according to the methods of the invention.

According to a presently preferred embodiment of the invention, the sponge 32 is impregnated with a polishing abrasive 44 either before or after the sponge 32 is attached to the wiper 40. The presently preferred polishing abrasive is a rare earth cerium oxide compound such as the compound sold by SOMACA (previously identified) sold under Stock No. 263-1014. The SOMACA compound has an average particle size of about 3 microns, a neutral pH of 7, and a 3–10% Baume concentration. Other conventional abrasive cleansers such as those sold under the trademarks COMET® and AJAX® could also be employed.

After impregnating the sponge 32 with the polishing abrasive 44, water is applied to the windshield 20 and/or the sponge 32 and the windshield wiper mechanism (not shown) is activated so that the wiper blade 40 wipes the windshield 20. The normal force of the wiper blade 40 against the windshield 20 causes the sponge 32 to press against the windshield 20 and scrub the windshield with the abrasive polish 44. After several wipes of the windshield, more water is applied to wash the remaining abrasive 44 from the windshield 20 and the sponge 32 may be removed from the wiper blade 40. The result of the procedure is an evenly polished windshield 20 with very little scattering of abrasive. In addition, the procedure can be carried out in the field without any additional equipment or electrical supply. Moreover, the procedure will also effectively clean the window as it polishes and remove any unwanted, hard-to-remove oily films or insect or dirt residue.

An alternative method according to the invention is the same as described above, but utilizes the built-in windshield washer spray (not shown) of a vehicle to supply to water for polishing and for clean-up.

In another alternative method according to the invention, the sponge 32 is not directly impregnated with abrasive 44. Instead, a mixture of abrasive and water is applied to the windshield 20 before and/or during operation of the wiper 40 carrying the sponge 32. The abrasive-water mixture may be applied manually, or through the windshield washer apparatus (not shown).

There have been described and illustrated herein several embodiments of a method and apparatus for removing scratches from a vehicle windshield. While particular embodiments of the invention have been described, it is not intended that the invention be limited thereto, as it is intended that the invention be as broad in scope as the art will allow and that the specification be read likewise.

Thus, while particular polishing abrasives have been disclosed, it will be appreciated that other polishing abrasives could be utilized. Also, while a single windshield wiper has been shown, it will be recognized that several sponges could be used with several wipers to polish a single or multiple windshields contemporaneously or simultaneously. Moreover, while particular configurations have been disclosed in reference to the radial opening, it will be appreciated that more than one radial opening may be provided so that the cylindrical sponge may be properly located on the wiper blade.

Furthermore, while the cylindrical sponge has been disclosed as having at least one open end defining a bore, it will be understood that two open ends defining a throughbore can achieve the same or similar function as disclosed herein. In addition, while the sponge of the invention has been shown as circular cylindrical, any substantially cylindrical sponge may be used with similar results obtained.

It will therefore be appreciated by those skilled in the art that yet other modifications could be made to the provided invention without deviating from its spirit and scope as so claimed.

What is claimed is:

1. An apparatus for removing scratches or stains from a vehicle windshield, said apparatus for use in conjunction with the vehicle's windshield wiper blade and a polishing abrasive compound, said apparatus comprising:

a substantially cylindrical sponge having at least one open end defining a longitudinal bore and at least one radial opening communicating with said longitudinal bore, wherein said longitudinal bore is dimensioned so that the vehicle's windshield wiper blade can fit snugly inside said substantially cylindrical sponge, and said at least one radial opening is dimensioned and located to allow a windshield wiper arm to be connected to the windshield wiper blade.

2. An apparatus according to claim 1, wherein:

said sponge is impregnated with a polishing abrasive compound.

3. An apparatus for removing scratches from a vehicle windshield, said apparatus for use in conjunction with the vehicle's windshield wiper blade, said apparatus comprising:

a) a substantially cylindrical sponge having at least one open end defining a longitudinal bore and at least one radial opening communicating with said longitudinal bore, wherein said longitudinal bore is dimensioned so that the vehicle's windshield wiper blade can fit snugly inside said substantially cylindrical sponge, said at least one radial opening is dimensioned and located to allow a windshield wipe arm to be connected to the windshield wiper blade; and b) an abrasive polishing compound.

4. An apparatus according to claim 3, wherein:

said substantially cylindrical sponge is impregnated with said abrasive polishing compound.

5. An apparatus according to claim 4, wherein:

said abrasive polishing compound is a rare earth cerium oxide compound.

6. An apparatus according to claim 5, wherein:

said abrasive polishing compound has an average particle size of about 3 microns, a neutral pH of 7, and a 3–10% Baume concentration.

7. An apparatus according to claim 3, wherein:

said abrasive polishing compound is a rare earth cerium oxide compound.

8. An apparatus according to claim 7, wherein:

said abrasive polishing compound has an average particle size of about 3 microns, a neutral pH of 7, and a 3–10% Baume concentration.

9. A method for removing scratches or stains from a windshield of a vehicle having a windshield wiper which includes a wiper blade connected to a wiper arm, said method comprising:

a) obtaining a substantially cylindrical sponge having at least one open end defining a longitudinal bore and at least one radial opening communicating with said longitudinal bore;
b) detaching the wiper blade from the wiper arm;
c) sliding the wiper blade into said longitudinal bore;
d) aligning the wiper blade inside said longitudinal bore so that the wiper arm may be re-attached to the wiper blade via said radial opening;
e) re-attaching the wiper blade to the wiper arm;
f) applying a polishing abrasive to one of the windshield and said sponge;
g) applying water to one of the windshield and said sponge; and
h) operating the vehicle windshield wiper to wipe the windshield with said sponge.

10. A method according to claim 9, wherein:
said step of applying a polishing abrasive to one of the windshield and said sponge comprises impregnating said sponge with said polishing abrasive.

11. A method according to claim 10, wherein:
said step of impregnating said sponge is performed before said step of sliding the wiper blade into said longitudinal bore.

12. A method according to claim 11, wherein:
said abrasive polishing compound is a rare earth cerium oxide compound.

13. A method according to claim 12, wherein:
said abrasive polishing compound has an average particle size of about 3 microns, a neutral pH of 7, and a 3–10% Baume concentration.

14. A method according to claim 10, wherein:
said abrasive polishing compound is a rare earth cerium oxide compound.

15. A method according to claim 14, wherein:
said abrasive polishing compound has an average particle size of about 3 microns, a neutral pH of 7, and a 3–10% Baume concentration.

16. A method according to claim 9, wherein:
said abrasive polishing compound is a rare earth cerium oxide compound.

17. A method according to claim 16, wherein:
said abrasive polishing compound has an average particle size of about 3 microns, a neutral pH of 7, and a 3–10% Baume concentration.

* * * * *